March 15, 1932.　　M. HÖCHSTÄDTER　　1,849,873

HIGH TENSION CABLE

Filed June 4, 1929

WITNESS
Oliver W. Holmes

INVENTOR
Martin Höchstädter
BY Knight Bros.
ATTORNEYS

Patented Mar. 15, 1932

1,849,873

UNITED STATES PATENT OFFICE

MARTIN HÖCHSTÄDTER, OF BRUSSELS, BELGIUM, ASSIGNOR TO NAAMLOOZE VENNOOTSCHAP HANDELMAATSCHAPPIJ CABLON (CABLON CORPORATION), OF THE HAGUE, NETHERLANDS

HIGH TENSION CABLE

Application filed June 4, 1929, Serial No. 368,341, and in Germany January 6, 1926.

Applications have been filed in Germany, Jan. 6, 1926; Canada, Nov. 13, 1926; Japan, Dec. 17, 1926; Holland, Nov. 1, 1926; Switzerland, Nov. 2, 1926; Czechoslovakia, Nov. 3, 1926; Norway, Oct. 28, 1926; Denmark, Nov. 1, 1926; Sweden, Oct. 30, 1926; Spain, Dec. 4, 1926; Austria, Oct. 27, 1926; Hungary, Oct. 28, 1926; Italy, Dec. 3, 1926; England and Ireland, Nov. 4, 1926; France, Nov. 10, 1926; Belgium, Dec. 17, 1926.

The present application is in part a continuation of my prior application, entitled High tension cables, filed December 27, 1926, Serial No. 157,400.

The reliability of an electric cable in service is increased with respect to the electric stresses if its insulating material is put under pressure. This has been attained by arranging tubes with permeable walls in the cable and separated from its electrical insulation, such tubes being fit for receiving and conducting a liquid or gaseous pressure medium which at suitable places is put under pressure by external mechanical means.

The permeable walls permit a free and direct transmission of the hydrostatic pressure of the pressure medium to all points of the inner or outer surface of the core insulation, also a cable previously provided with the external protecting covering may be impregnated through these tubes. Certain difficulties, however, arise owing to the intimate connection between the pressure medium and the insulating material by this arrangement with permeable walls.

The insulating impregnation material must be identical with the pressure medium, that is, it must be still liquid at the lowest working temperatures. This is, however, for electrical reasons often undesirable. The tubes must also generally be evacuated in the factory before the cable is sent out. Consequently the core insulation loses entirely or partially its impregnating material, and therefore a second impregnation is necessary after the cable is laid, which wastes time and is less reliable. Impregnation with the liquid pressure medium cannot easily be carried out previous to the application of the lead covering, that is to say the usual impregnation methods and the now generally adopted manufacturing apparatus cannot be made use of. The use of an impregnating material different from the pressure medium, for example a viscous liquid, is very difficult because the two materials mix later, more particularly at high working temperatures, in a manner which cannot be controlled. Also, the impregnation of multiple core cables is very difficult after the cores have been laid up; the cores must be separately impregnated before laying up.

These drawbacks are obviated according to the invention which is, therefore, of great advantage when artificial pressure is used in cables, more particularly for cables manufactured in the usual way with the usual impregnating material the latter being different from the pressure medium.

The invention is based on the new experience that it is not necessary to maintain the pressure liquid in bodily contact with the impregnating material of the insulation, but that the favorable effect of the pressure on the reliability of the cable in service is also obtained if an impermeable membrane is inserted between the pressure medium and the insulation. This membrane must, however, be sufficiently flexible in order to allow a uniform transmission of the pressure from the pressure medium to the insulation at all points.

Therefore, according to the invention, impermeable flexible layers are provided between the actual insulating material and the channels for receiving and conducting the pressure medium in the cable. If tubes with permeable walls are used in the channels besides, this is only done for other, for example mechanical, reasons.

The accompanying drawings show several examples of cable according to the invention.

Figure 3:
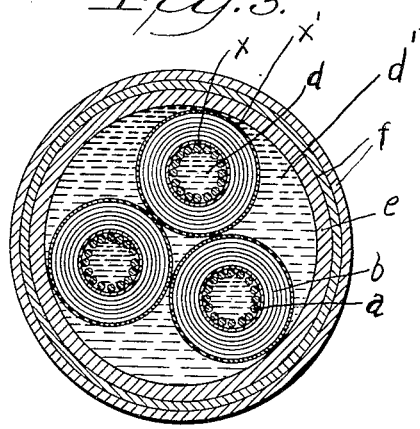
Figure 4:
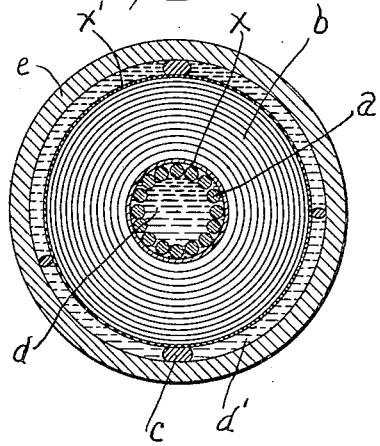

Figure 3 is a cross-section of a three core cable with metallized cores in which impermeable membranes or layers are provided on each side of the insulation, and pressure fluid is supplied both inside and outside the core; and Figure 4 is a cross-section of a single core cable with impermeable membranes or layers on each side of the insulation, and with pressure fluid applied both inside and outside the core.

Figure 1:
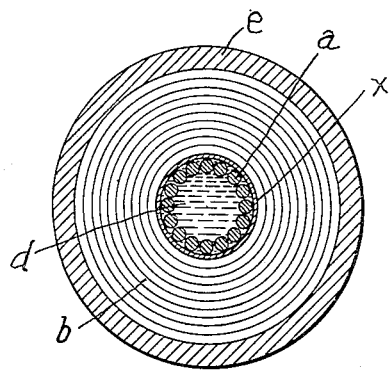
Figure 1 is a cross-section of a single core cable with an impermeable layer around the hollow copper conductor.

The single core cable as shown in Figure 1 consists of a metal conductor $a$, the insulation $b$ and the lead covering $e$. The conductor $a$ is hollow, the inner space $d$ serving as a pressure channel. The insulation $b$ is separated from the metal conductor by a membrane $x$. The cable can be manufactured and laid in the usual manner, that is, the membrane $x$ is applied to the copper conductor $a$ and the insulating material $b$ is wound on and then the cable is impregnated with a suitable impregnating material. The lead covering $e$ is then applied.

The membrane $x$ can be formed in different ways, of one or more layers, so long as it satisfies the two-fold condition that it is sufficiently impermeable to the impregnating material in the insulation $b$ and to the pressure medium in the channel $d$ and is also sufficiently flexible. This membrane $x$ can, therefore, consist of a conducting or of a non-conducting material; it can have the form of a thin cylinder with or without a seam, or the form of a wound tape. In the latter case a tape of paper or fabric is preferably selected which is soaked with a synthetic resin or a similar substance. By this the tape and the membrane formed of it become impermeable also at the overlapping edges of the tape, since the latter are caused to adhere by the application of heat during the drying of the insulation $b$ before its impregnation. In this way an impermeable layer is obtained which adheres as a completely flexible membrane to the inner surface of the insulation $b$ since the membrane is practically composed of the same material (paper) as the insulation $b$.

After this cable has been manufactured in the known manner it differs from an ordinary single core cable only by the inserted membrane $x$ and the hollow space $d$. After it has been laid, the hollow space $d$ can easily be filled with the pressure medium, for example a thin liquid oil, after, if required, the adhering moisture has been removed by the application of vacuum and heat or simply by passing warm air through the channels.

A continuous connection of the pressure channel $d$ over the required length is preferably effected in the cable junction boxes. The external apparatus, for example pressure pumps, batteries of gas bottles and the like, which supply the pressure for the pressure medium, are preferably arranged at the cable terminal boxes.

Figure 2:
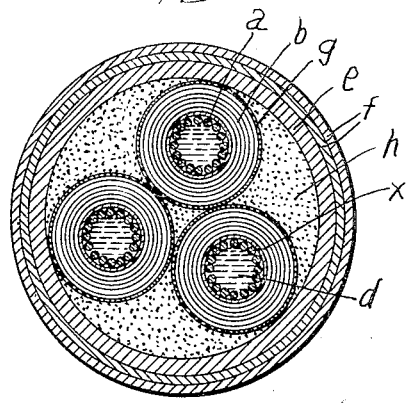
Figure 2 is a cross-section of a three core cable with metallized cores in which an impermeable layer (a membrane) is provided around the hollow copper conductor of each core.

Figure 2 shows the cross-section of a three core cable with metallized cores, in which every core is constructed as shown in Figure 1. $f$ is the double iron tape armouring, $g$ the electrically conducting layer of the outer surfaces of the cores, which may, for example, be metallized by known processes, in order to prevent ionization. The latter metallizing is preferably permeable, in order to allow the core to be impregnated through it. $h$ are the filling spaces which in the usual manner are filled with jute or other material.

The whole of the cable within the lead is manufactured exactly as in Figure 1 in the usual manner, that is, the hollow copper conductors $a$ are wound with the membrane $x$ and the insulating material $b$, laid up together and with the material $h$ in the dry state, impregnated, covered by the lead and armoured. The cable is laid and pressure applied similarly as indicated for the example described with respect to Figure 1.

The membrane $x$ during the impregnation process prevents the impregnating material from penetrating into the channels $d$ and in service any diffusion between the materials in $b$ and $d$. It transmits, however, the pressure mechanically from $d$ to $b$, by which th di-electric strength of the insulation $b$ is raised.

Referring to the embodiment illustrated in Figure 3, the construction here is intended to illustrate one of many possible constructions in which the pressure fluid exerts its pressure on the insulation, both inwardly and outwardly, through an impermeable but flexible membrane. The construction here chosen for illustration follows in general that illustrated in Figure 2, with the exception that an additional impermeable and flexible membrane or layer $x'$ is applied around the insulation of each core, and the filling space is occupied by a second body of pressure fluid $d'$.

In Figure 4 the same principle of applying pressure to both sides of the insulation is illustrated, as in Figure 3, but in this example, the construction is applied to a single stranded core. The insulation $b$ of the core is here shown as having the impermeable and flexible membrane $x$ on its inner surface, and a similar impermeable flexible membrane $x'$ on its outer surface. The inner pressure fluid is shown at $d$, whereas the outer pressure fluid $d'$ is disposed between the impermeable flexible membrane $x'$ and the lead covering $e$, the pressure fluid space between them being maintained by a spiral $c$ of sufficiently rigid material.

In the above described constructions the armouring $f$ withstands the radial pressure exerted in the outward direction by the pressure medium. In the absence of armouring the lead covering $e$ must eventually be made sufficiently resisting by alloying or otherwise, so that it can withstand this pressure provided the cable is not drawn into tubes of sufficient resistance.

I claim:—

1. A high tension cable comprising a metal conductor, insulating material therefor, a pressure fluid channel in said conductor, a layer of impermeable and flexible material between said conductor and said insulating material, and a pressure fluid in said pressure fluid channel.

2. A high tension cable comprising a metal conductor, insulating material therefor, a pressure fluid channel in said conductor, an impermeable and flexible layer consisting of a tape-like winding containing synthetic resins disposed between said conductor and said insulating material, and a pressure fluid in said pressure fluid channel.

3. A high tension cable comprising a metal conductor, insulating material therefor, a pressure fluid channel in said conductor, an impermeable and flexible layer in the form of a thin cylinder disposed between said conductor and said insulating material, and a pressure fluid in said pressure fluid channel.

4. A high tension cable comprising a conductor, insulating material therefor, pressure fluid channels inside and outside said insulating material, a layer of impermeable and flexible material between each of said pressure fluid channels and said insulating material, and a pressure fluid in each of said channels.

MARTIN HÖCHSTÄDTER.